United States Patent [19]

Oster et al.

[11] Patent Number: 4,537,099
[45] Date of Patent: Aug. 27, 1985

[54] TENSIONING AND BRAKING PLIERS

[76] Inventors: Stanley M. Oster, 871 SW. 88 Ter., Plantation, Fla. 33024; Lester Axelrod, 3650 N. 36 Ave., Hollywood, Fla. 33021

[21] Appl. No.: 485,276

[22] Filed: Apr. 15, 1983

[51] Int. Cl.³ .............................................. B25B 7/00
[52] U.S. Cl. ...................................... 225/93; 81/355; 81/387; 81/422; 81/425 R
[58] Field of Search ........... 81/5.1 R, 5.1 A, 418–426, 81/181, 180 B, 186, 354–355, 381, 383, 386–387; 7/107; 225/93, 104; 269/279, 284; 72/413, 409

[56] References Cited

U.S. PATENT DOCUMENTS

| | | | |
|---|---|---|---|
| 316,430 | 4/1885 | Derby | 81/5.1 A |
| 491,222 | 2/1893 | Pellet | 269/279 X |
| 1,625,064 | 4/1927 | Vello | 81/5.1 R |
| 2,082,669 | 6/1937 | Voigt | 81/5.1 A |
| 2,736,218 | 2/1956 | Atkeson | 81/5.1 R |
| 2,853,907 | 9/1958 | Bakke | 81/5.1 A |
| 2,938,414 | 5/1960 | Blommé | 269/279 X |
| 4,090,420 | 5/1978 | Insolio | 81/5.1 A |

Primary Examiner—Frederick R. Schmidt
Assistant Examiner—Debra S. Meislin
Attorney, Agent, or Firm—Eugene F. Malin

[57] ABSTRACT

A combination tensioning and braking tool providing an improved mechanical means for removing interior portions from plates of plate vitreous material, such as glass. The tool includes a spring-loaded handle and a pair of cooperating jaws, both of which contain a movable head. The tool may be used for opening or running scored lines between holes which are drilled through the sheet by allowing pressure to be alternately applied to the same side of the scored line for the run and then pressure to the opposite side of the scored line for reverse runs. The tool may also be used for braking a cut when the pressure applying surfaces of the head means are in a nonworking position.

2 Claims, 6 Drawing Figures

TENSIONING AND BRAKING PLIERS

SUMMARY OF THE INVENTION

A tensioning and braking pliers with two cooperating jaws, a handle, and a body portion. A portion of the handle is movable to drive one cooperating jaw toward engagement with the other cooperating jaw. Each jaw includes a movable head means and an anvil means. Each head means has selective positions which allow each cooperating jaw to function in a series of combinations. For example, the head means of the upper cooperating jaw is positioned to apply pressure and the head means of the lower cooperating jaw is positioned in a nonworking position such that when the vitreous plate material is gripped by the pair of cooperating jaws, compression is applied lateral to the score line on both sides of the plate vitreous material and pressure is applied directly to the score line. Once the cut or run has been made with the head means in the above positions, the head means of the upper cooperating jaw is positioned in a nonworking position and the head means of the lower cooperating jaw is positioned to apply pressure such that when the vitreous plate material is gripped by the pair of cooperating jaws, compression is applied lateral to the score line on both sides of the plate vitreous material and pressure is applied directly to the score line from the underneath side. This type of cut or run is a reverse run or cut.

A series of alternating runs and reverse runs can be made to weaken the area (circumscribed) by a series of predrilled holes and score lines. Additionally, the head means of the upper cooperating jaw and the head means of the lower cooperating jaw may both be positioned in a nonworking position such that when the plate vitreous material is gripped by the cooperating jaws direct downward pressure may be extended to act as braking pliers.

It is an object of this invention to provide a mechanical means for opening a cut along a previously made score line between two holes which are cut through the surface of plate vitreous material.

It is another object of this invention to provide a mechanical means for removing the interior portion from a sheet of vitreous plate material.

It is yet another object of this invention to provide a single tool that can perform the series of functions needed to remove the interior portion from a sheet of vitreous plate material.

DESCRIPTION OF THE PREFERRED EMBODIMENT

Figure 1:
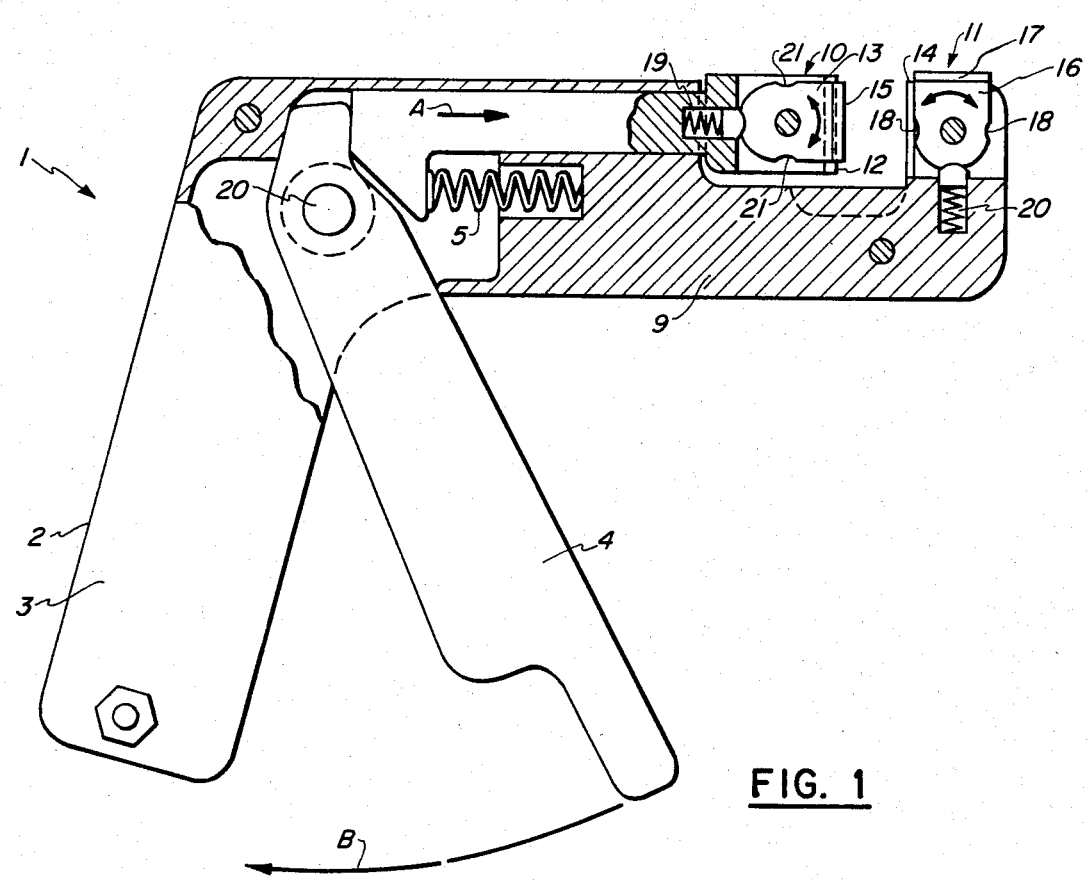
FIG. 1 is a side view of the tensioning and braking pliers.
Figure 2:
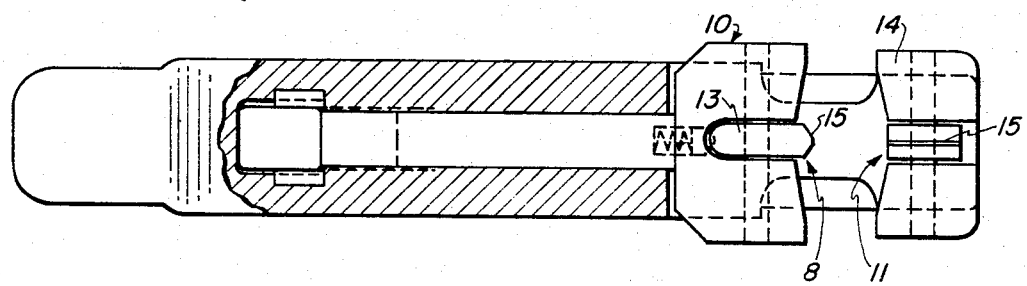
FIG. 2 shows a breakaway view of top elevation of the tensioning and braking pliers.

Referring now to FIG. 1, the tensioning and braking plier device 1 has a handle means 2. The handle means 2 includes a stationary handle portion 3 and a moveable handle portion 4. The moveable handle portion 4 is connected to the stationary handle portion 3 by a pin 20. The moveable handle portion 4 is spring biased 5 allowing the moveable handle portion 4 to move along the arc length B when pressure is applied by gripping the handle portions 3 and 4. This allows the connecting means 8 to move longitudinally (A) along the body portion 9 of the tensioning and braking plier device 1 toward the opposing cooperating means 11. As the pressure is released, the moveable handle portion 4 moves in the opposite direction. A moveable cooperating means 10 is attached to the longitudinal body portion 9 and moves relative to a second cooperating means 11 which is attached to the stationary body portion 9. The moveable cooperating means 10 contain an anvil means 12 and a head means 13. The stationary cooperating means 11 contains an anvil means 14 and a head means 16. The head means 13 of the moveable cooperating means 10 includes a pluralilty of surfaces 21 and 15. The head means 16 of the stationary cooperating means 11 includes a plurality of surfaces 17 and 18. The plurality of surfaces of the head means 13 includes at least one protruding portion 15 and at least one passive portion 21. The plurality of surfaces of the head means 16 includes at least one protruding portion 17 and at least one passive portion 18. Additional surfaces could include but are not limited to a surface that is flush with the anvil portion. The head means 13 is rotatable within the anvil means 12 of the moveable cooperating means 10. The head means 16 is rotatable within the anvil means 14 of the stationary cooperating means 11. A positioning means 19 cooperates with the passive portion 21 of the head means 13 of the moveable cooperating means 10. A positioning means 20 cooperates with the passive portion 18 of the head means 16 of the stationary cooperating means 11.

Figure 3A:
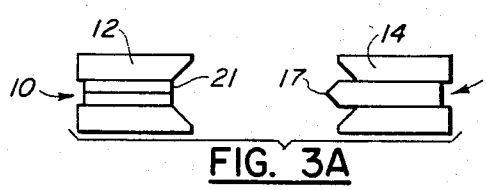
FIGS. 3A-3D show the head means and anvil means of the cooperating jaws in a series of combinations.
Figure 3C:
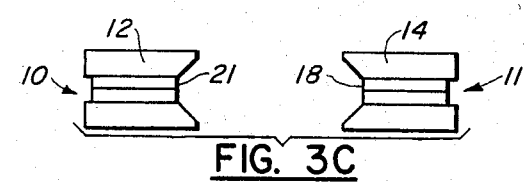
Figure 3B:
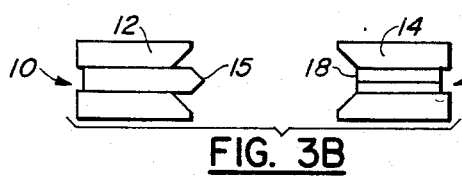
Figure 3D:
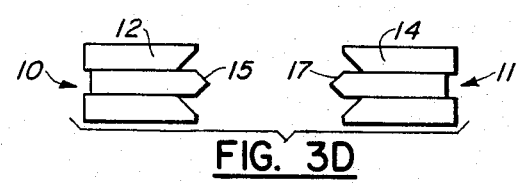

The head means 13 of the moveable cooperating means 10 and the head means 16 of the stationary cooperating means 11 can be used in a combination of ways. FIG. 3A shows the head means 13 in a passive position 21 and the head means 16 in protruding position 17. This combination of positions of the head means 13 and the head means 16 opens or fractures the score line in a scored plate vitreous material by applying compression directly under the score line and an opposing force on the same side as the score line. FIG. 3B shows the head means 13 in a protruding position 15 and the head means 14 in a passive position 18. The combination of positions of the head means 13 and the head means 16 provides a second type of run, reverse running, which is the opposite of opening a cut in the conventional manner. Compression is applied to the center of the underside of the now fractured or opened score line while the opposing force is applied to the upperside of the fractured score line. FIG. 3C shows the head means 13 in a passive position 21 and the head means 16 in a passive position 18. This combination of positions of the head means 13 and the head means 16 allows the tensioning and breaking plier device 1 to be used as a breaking pliers allowing the plate vitreous material to be gripped and securely held. Downward pressure may then be applied to one side of a score line to break an edge portion from a sheet of plate vitreous material. FIG. 3D shows the head means 13 in a protruding position 15 and the head means 16 in a protruding position 17. Additional surface portions would provide additional combinations.

The instant invention has been shown and described herein in what is considered to be the most practical and preferred embodiment. It is recognized, however, that departures may be made therefrom within the scope of the invention and that obvious modifications may occur to a person skilled in the art.

What I claim is:

1. A tensioning and breaking plier device for removing the interior portion of a sheet of vitreous material between at least two holes drilled in said material, there being score lines connecting said holes, said device comprising:

a handle means operable for manipulating said device;

a pair of cooperating means constructed and arranged for gripping, at a working position, said sheet of vitreous material on opposite sides of said vitreous material to facilitate the tensioning and breaking of the sheet of vitreous material along the score line;

connecting means connected between said handle means and each of said cooperating means for moving said pair of cooperating means towards one another in response to operation of said handle means to grip the sheet of vitreous material at said working position; and each of said cooperating means having an anvil means and a movable head means, each of said head means having a pressure applying surface and a passive surface which are connected for movement within said anvil means to selectively position one of either said pressure applying surface or said passive surface at said working position, said anvil means having portions engaging said vitreous material on opposite sides of said score line when said head means passive surface is at said working position, whereby the running, reverse running or breaking said sheet along said score line is determined by the position of said positioned surfaces selected.

2. A tensioning and breaking plier device as set forth in claim 1 wherein:

said head means are selectively moved so that one of the following combinations of pressure and passive surfaces are moved to the working position;

pressure applying surface to passive surface;

passive surface to pressure applying surface; or passive surface to passive surface for respectively running, reverse running or breaking said sheet along said score line.

* * * * *